United States Patent
Bollito et al.

(10) Patent No.: US 7,442,460 B2
(45) Date of Patent: Oct. 28, 2008

(54) DIRECT-ALCOHOL FUEL-CELL STACK AND CORRESPONDING METHOD OF FABRICATION

(75) Inventors: Gianluca Bollito, Turin (IT); Piero Perlo, Sommariva Bosco (IT); Mauro Sgroi, San Secondo di Pinerolo (IT); Gianfranco Innocenti, Rivalta (IT)

(73) Assignee: CRF Societa Consortile per Azioni, Orbassano (Turin) (IT)

( * ) Notice: Subject to any disclaimer, the term of this patent is extended or adjusted under 35 U.S.C. 154(b) by 441 days.

(21) Appl. No.: 10/624,608

(22) Filed: Jul. 23, 2003

(65) Prior Publication Data

US 2004/0018423 A1    Jan. 29, 2004

(30) Foreign Application Priority Data

Jul. 23, 2002    (IT)    ............................ TO2002A0643

(51) Int. Cl.
  *H01M 2/02* (2006.01)
(52) U.S. Cl. .............................. 429/34; 429/38; 429/39; 429/35
(58) Field of Classification Search ..................... 429/33
  See application file for complete search history.

(56) References Cited

U.S. PATENT DOCUMENTS 6,432,284 B1 *  8/2002  Narayanan et al. .......... 204/263
6,500,575 B1 *  12/2002  Shiue et al. ................ 429/27
6,503,654 B2 *  1/2003  Marchetti .................... 429/35
6,541,149 B1 *  4/2003  Maynard et al. ............. 429/40
2002/0182475 A1 *  12/2002  Pan ............................. 429/41
2003/0013003 A1 *  1/2003  Hinokuma et al. ........... 429/40

FOREIGN PATENT DOCUMENTS

WO    WO 00/69007 A    11/2000

OTHER PUBLICATIONS

L. Mex et al. "Miniaturized fuel cells based on microsystem technologies", vol. 39, Dec. 2001 (pp. 9-12).

* cited by examiner

*Primary Examiner*—Patrick Ryan
*Assistant Examiner*—Cynthia Lee
(74) *Attorney, Agent, or Firm*—Sughrue Mion, PLLC

(57) ABSTRACT

Described herein is a fuel-cell stack, which comprises a plurality of direct-alcohol fuel cells electrically connected together. Each cell has a miniaturized structure comprising a first electrode, a second electrode, an electrolyte set between the first electrode and the second electrode, means for conducting electrical current to the first electrode, and means for conducting electrical current to the second electrode. The miniaturized structure of each cell is made up of a plurality of layers set on top of one another, and the various miniaturized structures are associated in an unremovable way to a flexible substrate capable of being wound up in a roll.

24 Claims, 2 Drawing Sheets

DIRECT-ALCOHOL FUEL-CELL STACK AND CORRESPONDING METHOD OF FABRICATION

BACKGROUND OF THE INVENTION

The present invention relates to a direct-alcohol fuel-cell stack.

Fuel cells are electrochemical devices capable of converting the chemical energy contained in a fuel into electrical direct current, in the absence of moving parts.

Said electrochemical device comprises an anode and a cathode separated by an electrolyte, i.e., a substance that enables migration of the ions. In order to favour the electrochemical reactions it is necessary to use appropriate catalysts, for example platinum.

The cell is supplied with the fuel (typically hydrogen or another molecule containing hydrogen) and with an oxidant (typically oxygen or air), which, electrochemically combined, generate electricity and produce water as waste product.

The individual cells, characterized by voltages comprised between half a volt and one volt according to the technology adopted, can be connected in series, so as to obtain a total voltage of the desired value. Said arrangement of the cells forms the so-called fuel-cell stack, to which there can be associated an inverter and a transformer for converting the direct current generated by the stack of cells into alternating current at the desired voltage and at the desired frequency.

Development of fuel cells and of their applications is currently retarded to a large extent by the production costs involved, which are still high, and by certain technological and manufacturing problems.

In this perspective, it should for example be noted that the traditional systems of production of electrode structures for fuel cells are based upon the deposition of catalysts on carbon substrates, hot-pressed on an electrolyte in the form of a membrane. The said technique has proven costly.

Current fuel cells suffer, moreover, from a certain slowness of operation in the step of start-up of the electrochemical process, and this precludes their use in those applications that entail an immediate generation of electrical energy.

SUMMARY OF THE INVENTION

The purpose of the present invention is to provide a newly conceived fuel cell, of particularly advantageous use from the cost point of view and/or from the functional point of view for the purposes of production of fuel-cell usable as independent systems for the production of energy.

This and other purposes are achieved, according to the present invention, by a fuel-cell which has direct-alcohol fuel cells having a structure which comprises:
- a first electrode;
- a second electrode;
- an electrolyte arranged between the first electrode and the second electrode;
- means for conducting electrical current to the first electrode; and
- means for conducting electrical current to the second electrode, where said structure is miniaturized, made up of a plurality of layers set on top of one another and associated in an unremovable way to a flexible substrate.

Preferred embodiments of the fuel-cell according to the invention and of its method of fabrication are specified in the attached claims, which are understood as forming an integral part of the present description.

BRIEF DESCRIPTION OF THE DRAWINGS

Further purposes, characteristics and advantages of the present invention will emerge clearly from the description that follows with reference to the annexed drawings, which are provided purely by way of non-limiting example and in which.

DETAILED DESCRIPTION OF THE INVENTION

As mentioned in the introductory part of the present description, a fuel cell is a system consisting of two electrodes (an anode and a cathode), between which is set an electrolyte, usually in the form of a membrane, which directly converts chemical energy into electrical energy, without combustion or moving parts, by means of the electrochemical combination of hydrogen and oxygen, producing water, electricity and heat.

Methanol has proven one of the best candidates as fuel for fuel cells, on account of its ease of storage and transportation and its low cost. The use of methanol in liquid form enables a considerable reduction of the complexity of the fuel cells, enabling their application in various sectors. It should moreover be noted that in the case of cells which use methanol in aqueous solution, known as direct-methanol fuel cells (DMFCs), the fuel can be supplied in the absence of preliminary reforming, i.e., a treatment to which fuels rich in hydrocarbons must, instead, be subjected for converting them into hydrogen.

Figure 1:
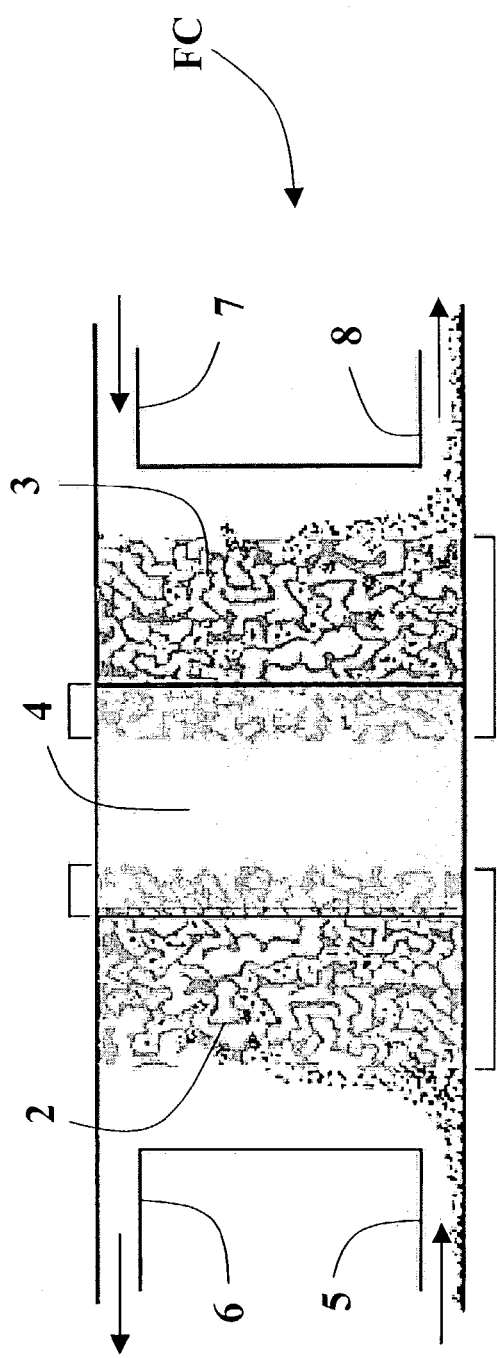
FIG. 1 is a schematic illustration of the structure of a direct-methanol fuel cell.

FIG. 1 is a schematic representation of the typical structure of a fuel cell which uses methanol in aqueous solution ($CH_3OH+H_2O$) as source of hydrogen.

In said figure, FC designates the cell as a whole, which comprises an anode 2 and a cathode 3, between which is set a suitable membrane 4, which has the function of electrolyte.

The electrodes 2 and 3 can each be formed by applying on the opposite faces of the membrane 4 a thin catalytic layer, consisting of granules of carbon activated with noble metals and carrying PTFE or Teflon™, for impermeabilization of some pores.

The cell FC moreover envisages two bipolar plates that are located on both sides of the membrane 4 and are provided for enabling passage of electrical current and for yielding heat to the external environment.

The reference numbers 5 and 6 designate, respectively, an inlet of the fuel in a chamber of the anode 2 and an outlet from said chamber for the carbon dioxide produced by the electrochemical reaction. The numbers 7 and 8 designate, respectively, an inlet for air into a chamber of the cathode 3 and an outlet from said chamber for the water produced by the electrochemical reaction.

In a cell of the type illustrated in FIG. 1, the alcohol laps the anode 2, whilst the oxidant laps the cathode 3. The catalytic layer of the anode 2 stimulates the electro-oxidation of the molecules of alcohol, which separate into positive ions and electrons. Whilst the electrons pass from the anode 2 to the cathode 3 through the electrical load, the protons migrate from the anode 2 to the cathode 3 through the membrane 4 and, once they have reached the cathode 3, combine with the oxygen in the air and with the electrons that come from the anode 2, to form water.

In other words, then, the water-methanol mixture is sent directly to the anode 2, by means of the inlet 5, where it reacts, releasing $CO_2$, $H^+$ ions, and electrons. By means of the inlet 7, the air is, instead, carried to the cathode 3, the $O_2$ of which reacts with the $H^+$ ions diffused through the membrane 4 and with the electrons, to be reduced to $H_2O$.

The cell reactions at the anode 2 and at the cathode 3 are, respectively, the following:

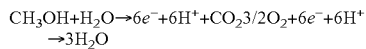
$$CH_3OH+H_2O \rightarrow 6e^- + 6H^+ + CO_2 3/2O_2 + 6e^- + 6H^+ \rightarrow 3H_2O$$

which, combined, yield the overall reaction:

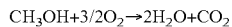
$$CH_3OH + 3/2O_2 \rightarrow 2H_2O + CO_2$$

There may thus be noted the transport of three different species:
- the electrons move through the carbon of the electrode/catalyst;
- the gases diffuse through the impermeabilized pores of the electrode layer, which, as has been said, consists of granules of carbon activated with noble metals and carrying PTFE or Teflon™ for impermeabilization of some pores;
- the liquid water flows through the non-impermeabilized pores.

According to a first important aspect of the invention, it is proposed to provide a new miniaturized structure of fuel cell of the type mentioned above, made up of more than one layers of different materials on a flexible support.

Figure 2:
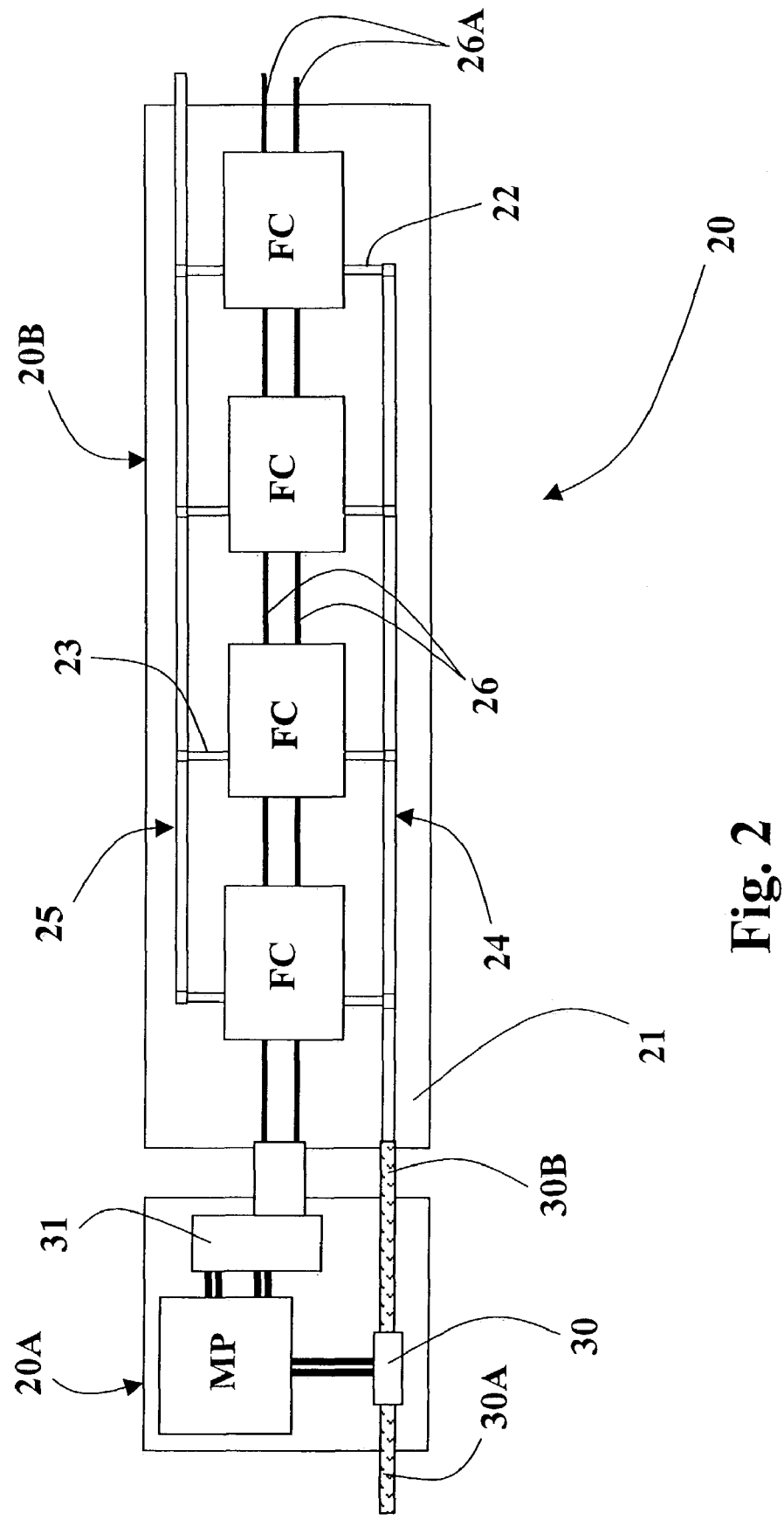
FIG. 2 is a schematic illustration of a miniaturized fuel-cell obtained in accordance with the present invention.

FIG. 2 is a schematic representation of a miniaturized direct-alcohol fuel-cell stack according to the invention, designated as a whole by 20.

The fuel-cell stack 20 has a control portion 20A and a portion for generation of energy 20B.

The portion 20B comprises a flexible support designated by 21, which in the case exemplified is in the form of a film made of polymeric material. By way of example, a material usable for the fabrication of the supporting film 21 is Kapton®, a light, insulating, polyamide material, which presents excellent resistance to heat, good thermal conductivity and is non-absorbent.

Provided on the film 21 are a plurality of miniaturized direct-methanol fuel cells, designated by FC, each provided with an inlet 22 for the fuel and an outlet 23 for the water resulting from the chemical reaction.

The reference number 24 designates a duct for supply of the methanol-based fuel, from which there branch off the inlets 22. The number 25 designates a duct for discharge of the water generated by the cells FC, from which there branch off the outlets 23.

The fuel-distribution system, formed by the duct 24 and by the inlets 22, and the water-discharge system, formed by the duct 25 and by the inlets 23, can be obtained by hot-pressing of a polymeric layer on the supporting film 21.

The reference number 26 designates conducting paths that connect the cells FC in series to one another; said connections can be obtained by means of deposition of electrically conductive material on the supporting film 21.

The control module 20A comprises a micro-pump 30, preferably of a piezoelectric type and made using MEMS (Micro Electro-Mechanical-Systems) technology, which has the function of regulating the supply of fuel to the various cells FC. For this purpose, the micro-pump 30 comprises a respective inlet branch 30A, for connection to the source of methanol in aqueous solution, and a delivery branch 30B, provided for being hydraulically connected, with modalities in themselves known, to the duct 24 of the portion 20B.

The micro-pump 30 has also the important function of maintaining the cell FC moist, when this is not in use, with the aim of preventing the deterioration of its electrode-electrolyte structure.

The micro-pump 30 is controlled by a microprocessor designated by MP, which likewise controls a supercapacitor, designated by 31. The supercapacitor 31 is of a conception in itself known and consequently will not be described herein; here it will suffice to recall that a supercapacitor is an electronic device, obtainable using nanotechnologies, which is capable of accumulating static electricity and supplying electrical energy and is made up of two polarizable electrodes, a separator, and an electrolyte, where the electric field is stored in the interfaces between the electrolyte and the electrodes.

In the application herein proposed, the supercapacitor 31 is provided for being electrically connected, with modalities in themselves known, to the paths 26 at input to the first cell FC of the portion 20B. Its function is that of compensating the time of response of the electrochemical system and activating the electrical load supplied by the fuel-cell stack 20 before this can achieve the maximum electrical output to the output 26A of the paths 26. The first cell FC of the portion 20B of the fuel-cell stack, as in a loop, functions then as charger of the supercapacitor 31, when the electrical load does not absorb current.

A further function of the supercapacitor 31 is that of supplying the microprocessor MP, and thus also the micro-pump 30.

As mentioned previously, traditional systems of production of the electrode structures for fuel cells are based upon the deposition of catalysts on carbon substrates, hot-pressed on the electrolyte, i.e., the membrane.

According to the present invention, there is instead proposed recourse to micromachining to obtain multiple layers that form the components of the cells FC on the substrate made from the film 21, with a technique similar to the one currently in use for the production of various printed circuits.

Figure 3:
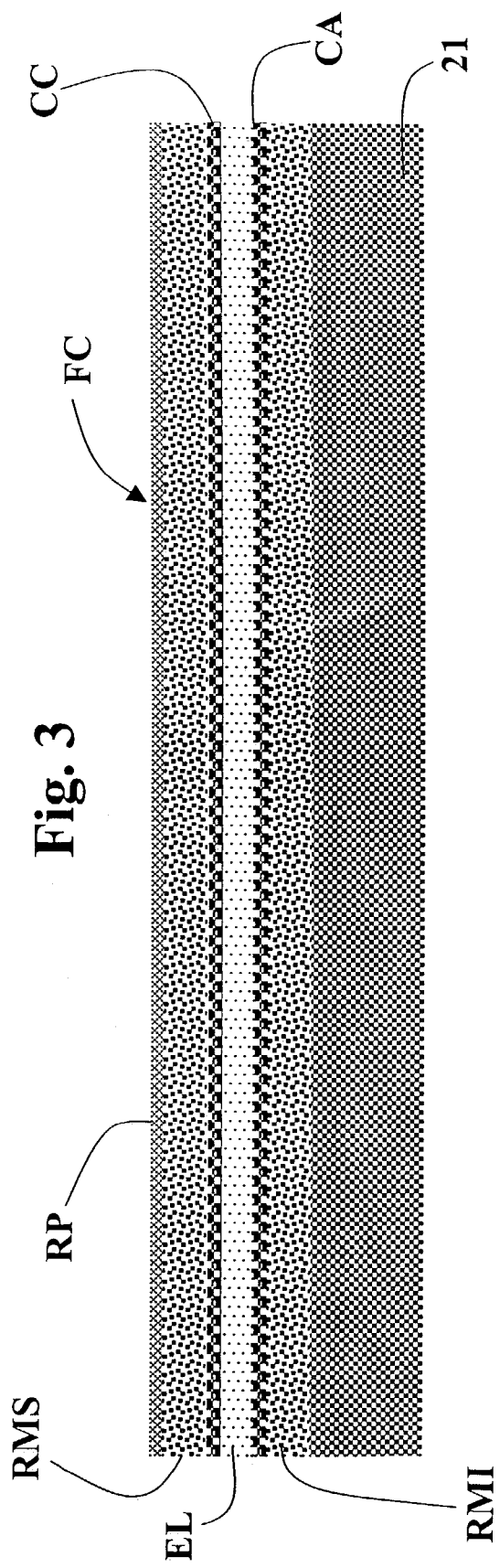
FIG. 3 represents a schematic cross-sectional view of a miniaturized fuel cell obtained according to the invention.

FIG. 3 shows the multi-layer structure of an individual miniaturized cell FC provided according to the invention, which can be obtained with various procedures.

In a first possible implementation, on the flexible supporting film 21 there are defined the paths 26, by means of deposition of electrically conductive material. The supporting film 21 is then provided with the fuel-distribution system 22, 24 and the water-discharge system 23, 25, for example by means of hot-pressing of a polymeric layer on the film itself.

Subsequently, in an area corresponding to the area in which a cell FC is to be obtained, deposited on the film 21 is a layer of metallic coating, designated in FIG. 3 by RMI. On the layer RMI there is then positioned an electrode-electrolyte assembled structure, which comprises:
- an appropriate anodic catalyst, designated by CA, which functions as positive electrode;
- an appropriate cathodic catalyst, designated by CC, which functions as negative electrode; and
- a suitable electrolyte EL, set between the anodic catalyst CA and the cathodic catalyst CC.

Following upon positioning of the aforesaid assembled structure, on the cathodic catalyst, there is deposited a layer of metallic coating RMS. Possibly deposited on the latter is, finally, a protective layer made of polymeric material RP.

As an alternative to the technique described herein, the electrode-electrolyte structure could be obtained by depositing the anodic catalyst CA on the layer RMI. On the anodic catalyst CA there will then be positioned or deposited the electrolyte EL. This will be followed, in order, by deposition of the cathodic catalyst CA, of the layer of metallic coating RMS, and of the possible protective layer RP.

Another possibility is that of obtaining separately the complex formed by the layers RMI, CA, EL, CC, RMS, then to proceed to its fixing (for example, by gluing) on the flexible supporting film 21.

Operation of the miniaturized cells FC forming part of the fuel-cell stack illustrated in FIG. 2 is similar to the one described previously with reference to FIG. 1. It is to be noted, in this connection, that the metallic layers RMI and RMS provide means for conducting the electrical current to the electrodes CA, CC.

The electrodes or catalysts CA, CC may comprise granules of carbon and a noble metal, such as for example platinum, palladium, rhodium, iridium, osmium or ruthenium, and the electrolyte EL can be in the form of a membrane of Nafion®.

In a preferred embodiment, it is possible to envisage deposition of the catalysts CA, CC on zeolite materials, with the aim of increasing the catalytic activity. The electrolyte EL may thus advantageously be in the form of a composite Nafion®zeolite membrane, in order to enable reduction of the cross-over of methanol.

Once again in order to increase the catalytic activity, in an advantageous variant embodiment, the catalysts CA, CC can comprise fullerenes and/or carbon nanotubes and/or carbon nanofibres.

From what has been described previously, it is clear how the cells FC are supported by a polymeric film 21, giving rise to an overall flexible structure that may present a considerable development in length.

In effect, the said structure is thus configured as a continuous ribbon having a thickness of some millimetres, which can be rolled up. From said ribbon it will be possible to cut a piece designed to form the portion 20B illustrated in FIG. 2, comprising a desired number of cells FC according to the total voltage that it is intended to reach. To this piece there will evidently be combined the respective control portion 20A.

The use of micromachining for obtaining multiple layers that form the components of the cells FC on the flexible substrate made from the film 21 enables, according to the invention, production of low-cost fuel-cell stacks with high production volumes.

Of course, without prejudice to the principle of the invention, the details of construction and the embodiments may vary with respect to what is described and illustrated herein purely by way of example.

It is to be pointed out, in particular, that the structure described is applicable also to the production of other types of direct-alcohol fuel cells, i.e., designed for being supplied with ethanol or other alcohols different from methanol.

What is claimed is:

1. A fuel-cell stack comprising a plurality of direct-alcohol fuel cells;
    each cell having a structure comprising:
    a first electrode;
    a second electrode;
    an electrolyte arranged between the first electrode and the second electrode;
    means for conducting electrical current to the first electrode and the second electrode;
    wherein the entire structure of each cell is miniaturized and is made of superimposed layers;
    wherein the entire structure of each of the plurality of cells of the stack is associated in an irremovable way to a single flexible substrate;
    wherein a first duct is also associated in an irremovable way to the single flexible substrate, the duct being connected to the plurality of cells for supplying them with fuel, wherein the duct also connects the fuel cells to each other; and
    wherein a second duct is also associated in an irremovable way to said single flexible substrate, said second duct being connected to the plurality of cells configured to empty water from each cell.

2. The fuel-cell stack according to claim 1, wherein the single flexible substrate is made of polymeric material.

3. The fuel-cell stack according to claim 1, wherein associated to the single flexible substrate in an irremovable way are conducting paths, which electrically connect each cell to the next one.

4. The fuel-cell stack according to claim 1, wherein the means for conducting electrical current comprise a first layer of metallic material resting on the single flexible substrate and wherein the first electrode comprises an anodic catalyst in contact with said first layer.

5. The fuel-cell stack according to claim 1, wherein the means for conducting electrical current comprise a second layer of metallic material resting on the electrolyte and wherein the second electrode comprises a cathodic catalyst in contact with said second layer.

6. The fuel-cell stack according to claim 5, wherein on said second layer there is present a protective layer.

7. The fuel-cell stack according to claim 1, wherein the electrolyte is in the form of a membrane.

8. The fuel-cell stack according to claim 1, wherein the electrolyte has a composite structure comprising zeolite.

9. The fuel-cell stack according to claim 1, wherein the means for conducting electrical current to the first electrode and the second electrode are in the form of metallic layers.

10. The fuel-cell stack according to claim 1, wherein at least one between the first electrode and the second electrode comprises a catalyst containing granules of carbon and a noble metal selected from the group consisting of platinum, palladium, rhodium, iridium, osmium and ruthenium.

11. The fuel-cell stack according to claim 1, wherein at least one between the first electrode and the second electrode comprises a catalyst containing a material selected from the group consisting of fullerenes, carbon nanotubes, carbon nanofibres.

12. The fuel-cell stack according to claim 1, wherein at least one between the first electrode and the second electrode comprises a catalyst deposited on zeolite material.

13. The fuel-cell stack according to claim 1, wherein it comprises a first control part and a second energy generation part, the first part having a micro-pump, which is operative for regulating the supply of the fuel to the cells, the micro-pump comprising:
    a respective inlet branch, for connection to a source of the fuel; and
    a delivery branch, for connection to the delivery means.

14. The fuel-cell stack according to claim 13, wherein the micro-pump is a piezoelectric micro-pump and made using MEMS (Micro Electro-Mechanical Systems) technology.

15. The fuel-cell stack according to claim 13, wherein the micro-pump is operative for maintaining the cells moist in order to prevent deterioration of said miniaturized structure.

16. The fuel-cell stack according to claim 13, wherein the first part comprises a microcontroller for the control of the micro-pump.

17. The fuel-cell stack according to claim 13, wherein the first part comprises a supercapacitor provided for electrical connection to a cell.

18. The fuel-cell stack according to claim 17, wherein the supercapacitor is operative for supplying the microcontroller with electrical energy.

19. The fuel-cell stack according to claim 13, wherein the second part comprises the single flexible substrate with the respective cells, and the first part is distinct from the single flexible substrate and is provided for being connected electrically and hydraulically to one of the cells of the second part.

20. The fuel-cell stack according to claim 1, wherein the single flexible substrate is in the form of a ribbon developing in length and capable of being rolled up.

21. The fuel-cell stack according to claim 1, wherein the fuel is methanol in aqueous solution.

22. The fuel-cell stack according to claim 2, wherein the polymeric material is an insulating polyamide material.

23. The fuel-cell stack according to claim 6, wherein the protective layer is made of a polymeric material.

24. The fuel-cell stack according to claim 1, wherein the single flexible substrate has a length direction and the duct extends along the substrate in the length direction of the single flexible substrate.

* * * * *